(12) United States Patent
Gamble et al.

(10) Patent No.: US 6,440,526 B1
(45) Date of Patent: Aug. 27, 2002

(54) NON-SLIP PAD

(76) Inventors: Craig Steven John Gamble, 41 Waterdown Drive, Elanora QLD 4221 (AU); Andrew Glen Roche, 69 The Esplanade, Coombabah QLD 4216 (AU)

( * ) Notice: Subject to any disclaimer, the term of this patent is extended or adjusted under 35 U.S.C. 154(b) by 0 days.

(21) Appl. No.: 09/381,394

(22) PCT Filed: Mar. 24, 1998

(86) PCT No.: PCT/AU98/00190

§ 371 (c)(1),
(2), (4) Date: Sep. 20, 1999

(87) PCT Pub. No.: WO98/42562

PCT Pub. Date: Oct. 1, 1998

(30) Foreign Application Priority Data

Mar. 26, 1997 (AU) .............................. 16605/97
Nov. 21, 1997 (AU) .............................. 45295/97

(51) Int. Cl.$^7$ ................................. B32B 3/06
(52) U.S. Cl. .................. 428/100; 248/118; 248/118.1; 248/918; 297/284; 297/458; 297/459; 428/99; 428/192; 428/317.1; 428/317.3; 482/50; 482/70; 482/71
(58) Field of Search .................. 428/100, 99, 192, 428/317.1, 317.3; 482/51, 70, 71; 248/118, 118.1, 918; 5/446, 447; 297/458, 459, 284

(56) References Cited

U.S. PATENT DOCUMENTS

| 4,084,477 A | 4/1978 | Dominguez |
| 4,457,510 A | 7/1984 | Pertachuk |
| 5,129,101 A | 7/1992 | Douglas |
| 5,308,271 A | 5/1994 | Foulke |
| 5,435,765 A | 7/1995 | Fletcher |
| 5,803,416 A | * 9/1998 | Hanson ..................... 248/118 |

FOREIGN PATENT DOCUMENTS

| AU | 33890/94 | 4/1985 |
| AU | 33044/93 | 8/1993 |
| AU | 70396/94 | 5/1995 |
| AU | 30680/95 | 3/1996 |
| AU | 67354/94 | 8/1996 |
| GB | 2080672 | 2/1982 |
| GB | 2229982 | 10/1990 |

* cited by examiner

Primary Examiner—Nasser Ahmad
(74) Attorney, Agent, or Firm—Shoemaker and Mattare

(57) ABSTRACT

A pad (11) having a non-slip surface, the pad adapted for attachment to a substrate and for use in combination with a garment worn by a person, the pad comprising a layer of a flexible non-slip material. having a lower surface adapted to be removably attached to said substrate and an upper surface which is partially covered by a hook and loop type fastener (14) and the garment has a surface complementary to the hook and loop type fastener, such that in use the person can control the extent of engagement between the complementary surface of the garment and the hook and loop type fastener of the pad by selectively placing the garment on the pad so that the complementary surface can contact both the hook and loop type fastener and non-slip material.

23 Claims, 2 Drawing Sheets

NON-SLIP PAD

FIELD OF THE INVENTION

The present invention is directed towards a pad having an engagable surface and is especially directed towards a pad for use on watercraft or in wet areas.

The present invention will be described with particular reference to a pad for use on watercraft. It will be appreciated that the present invention has other applications and no limitation is intended thereby.

BACKGROUND ART

Watercraft such as surfboards generally have a smooth fiberglass surface. A wax coating may be applied to the surface to provide a non-slip coating. Foam pads which adhere to the surface of a surfboard and which provide a non-slip surface are also known. In recent years, the trend in surfing has been towards lighter and faster boards. These modifications have enabled surfers to launch their board from the wave and engage in "aerial maneuvers". Control of the board during such maneuvers is important for execution of the maneuver and safety of both the rider and neighboring riders. However, when the board and rider are air borne, the riders rear foot inevitably separates from the board. This results in a significant loss of control. Wax and the known foam pads which are currently used to provide a non-slip surface provide little assistance to an air borne surfer in keeping contact with the board.

There have been a number of proposals which have attempted to overcome this problem. Surf boards having loops through which a surfer can insert his feet have been proposed. A disadvantage of the foot loops is that the rider cannot move his feet so as to satisfactorily control the board. Also it is difficult to paddle a board with the loops affixed thereto. Thus these modified boards are limited to being used for aerobatics and are not suitable for traditional surfing techniques.

It has also been proposed to attach complimentary portions of a hook and loop fastening system such as that sold under the trade name VELCRO to the surfboard and a riders boot. However, it has been observed that it is not possible to adhere VELCRO to a fiberglass surface so that it will stay attached to the board during use. In order to overcome this problem, it has been proposed to permanently attach VELCRO strips to a surfboard by incorporating the VELCRO into a fiberglass strip. However, this does not allow worn or damaged VELCRO to be replaced and necessitates purchase of a new board as the VELCRO wears out. A further difficulty of attaching VELCRO to a surfboard is that a rider is unable to adjust the position of his foot without completely disengaging the foot from the VELCRO surface. This makes it impossible to make the slight foot adjustments which are necessary when riding a surfboard.

It is therefore an object of the present invention to at least partially overcome at least one of the above disadvantages or provide the public wish a useful choice.

SUMMARY OF THE INVENTION

According to a first embodiment of the present invention there is provided a pad for use in combination with a garment having an outer surface and at least a part of said surface is engagable with a hook and loop type fastener, the pad having one or more zones of a hook and loop type fastener such that in use a person wearing the garment can control the extent of engagement between the outer surface and the pad by placing the garment on the pad at selected locations.

The term hook and loop type fastener as used in the present specification and claims refers to fasteners having a hook portion and a portion complimentary to the hook portion such that the two portions are engagable. The use of the term also includes those types of fasteners known as hook and hook fasteners in which there are opposing portions of interlockable hooks.

The pad of the present invention may be used for any application where it is desirable for a person's grip on a surface to be enhanced. For example, the pad can be in the form of a mat for placement on slippery surfaces such as wet floors and also snow and ice. The pad may also be adapted to be attached to the surface of articles such as surfboards, body boards, skateboards, jet skis, sailboards and yachts.

The pad of the present invention is for use in combination with a garment worn by a person to enable the person to grip or engage the pad. Typically the garment's outer surface has at least one complimentary portion of the hook and loop type fastener affixed thereto. The outer surface of the garment may be completely covered with the hook and loop type material or may have one or more sections of the hook and loon type material attached thereto. Alternatively the garment itself may be made from a looped fabric which car engage a corresponding hooked portion attached to the pad. Preferably however the looped portion is attached to the pad and the hooked portion is attached to the garment.

Any type of garment may be used in combination with the pad of the present invention and any part of a garment can be adapted for engagement with the pad. Typically the garment is a boot or sandal. Alternatively, the garment is a wetsuit or the like in which the hook and loop type fastener is affixed to the chest portion. Such a garment would be suitable for use with a surfboard or body board to facilitate grip when paddling or riding. The garment may be adapted to be fitted over an existing garment such as a boot.

The garment may also be a glove and may be used to assist in griping the handlebars of a jet ski or the tiller of a boat. For example, the handlebars may be covered with the hook portion of the hook and loop type fastener. A corresponding glove may be partially covered with the loop portion of the fastener. Preferably, the loop portion is attached to the fingers and lower palm portion of the glove but does not cover that part of the glove corresponding "to the base of the fingers". This enables a user to adjust the position of the hand on the handle bar or other object without completely removing the hand therefrom. Complete disengagement from the handle bar is necessary if the glove is completely covered with the loop fastener. With the present glove a user can simply open the hand so as to disengage the fingers and palm from the handle bar, slide the hand over the handle to the desired position and reclose the fingers.

According to yet a further embodiment of the present invention there is provided a glove for use by a person to grip a cylindrical article covered with a hook and loop type fastener such as a handle bar, wherein the glove has an inner surface which is partially covered with a material complimentary to the hook and loop type fastener and has a zone which is not covered with the complimentary material such that in use when the user opens the hand, said zone can remain in contact with the article.

It will be appreciated that the glove of the present invention may be used in any application where it is desirable to facilitate the grip of a person's hand. The glove may be used to grip handles of tools such as hammers or devices such as rackets.

The pad of the present invention has one or more zones of a hook and loop type fastener such that in use a person can control the extent of engagement between the garment and the pad by selectively engaging different proportions of the fastener on the pad. The location of the one or more zones may be of any size, location or density depending upon the desired use of the pad, provided that selective placement of a garment onto the pad can change the extent of engagement between the pad and the garment. For example, in applications where it is desirable that there is a large amount of grip between the garment and pad such as on a surfboard for aerial maneuvers, the size of at least on zone preferably corresponds to the full size of the surface of the garment so as to provide the maximum engagable surface if desired. Alternatively in applications where such a degree of engagement is nor required, such as on the deck of a boat, the zones of hook and loop material may be substantially smaller. The pad surface may also have areas in which the distribution of the zones varies. For example, the pad surface may have a portion in which a plurality of zones are closely spaced and a second portion in which a plurality of zones are more dispersed. The portion having the closely spaced zones will engage a complimentary surface to a greater extent then the portion having the dispersed zones.

The zones of hook and loop fastener may be attached to the pad in any suitable manner. The sections may be glued or sewn in known manner. Preferably, the pad has upper and lower layers of a flexible material and the hook and loop type fastener is sandwiched between the two layers. In a preferred form of the invention a layer of a hook and loop type fastener is laminated between upper and lower layers of a flexible material such as a foam. The upper layer having apertures through which sections of the hook and loop type fastener may protrude. Similarly, the hook and loop type fastener may be attached to the garment by any suitable means such as gluing or stitching.

The pad may be fully covered so partially covered by the hook and loop type fastener. In one embodiment of the invention, the surface of a pad may be fully covered by a hook and loop type fastener and have one of more rib portions located thereon. The corresponding garment of footwear such as a wet suit bootie may be only partially covered with a surface complimentary to the fastener. Typically, the toe and heel of the bootie have a hook and loop type fastener attached thereto and that part of the booties lower surface which corresponds to the arch of the foot is not covered by a hook and loop type fastener. In use, a person can locate the foot on the flat portions of the pad, so as to engage the pad with toe and heel portions of the bootie. If the foot is located such that the central portions contacts the rib there is no or minimal engagement between the respective hook and loop portions.

Typically the pad has a zone of hook and loop type fastener at either end of the rib. In this way a person can slide the foot along the rib between engagement positions. Such a pad is suitable for use on the rear portion of a surfboard. In use a surfer can easily slide the foot along the rib to change the foot position.

In another embodiment of the invention, the surface of the pad may have zones of a hook and loop fastener having different densities of either hooks or loops. A zone of hook and loop with a low density of loops will normally engage a garment having a complimentary surface to a lesser extent than a zone having a high density of hooks or loops. The extent of engagement can be controlled by selectively engaging zones having different densities.

In a still further form of the invention, the pad may have one or more zones of both a hook portion and a loop portion of the hook and eye fastener. The outer surface of the corresponding garment may also have zones of both the hook and loop type fastener.

Preferably the surface of the pad further comprises at least one zone of a non-slip material. Such a pad is especially suitable for use on watercraft such as surfboards. A rider is able to disengage part of the garment whilst remaining in contact with the non-slip surface. This is desirable in applications such as surfboards as it allows a rider to optimize control and/or grip of the surfboard as desired. This is not possible if a board surface is covered with large amounts of VELCRO fastener. A rider cannot quickly and easily change feet position across a full VELCRO surface.

Non-slip materials which may be used in the preferred pad of the present invention are known and typically include flexible foam materials. Suitable foam materials include urethanes, vinylchloride foam material or olefinic materials such as polyethylene and copolymers of ethylene with vinyl acetate. An especially preferred material is ethylene vinyl acetate foam. The physical properties of the foam may vary and may be selected according to the desired substrate to which the pad is to be attached. For example, if the pad is to be used on areas where shock absorption is required, the density and thickness of the foam may be varied accordingly. Preferably the foam has a thickness of 6 to 12 mm, and preferably about 10 mm. The surface of the material may also be modified as desired and may be embossed. Preferably when the pad is to be used on watercraft the foam is provided with water shedding channels or the like.

In a preferred embodiment of the present invention, the lower surface of the pad is adapted to be attached to a substrate. Typically the pad is attached to the substrate by an adhesive. Preferably the lower surface of the substrate is provided with a layer of a pressure sensitive adhesive. The adhesive is typically strong enough to allow the pad to remain on the substrate during use, but to allow the pad to be removed and replaced as desired. It will be appreciated that in some applications the pad may simply be placed on a surface without an adhesive and may be held in place by frictional engagement between the lower surface of the pad and the substrate. Pads of this type may be in the form of mats for placement on wet areas when and where desired.

In an especially preferred form of the invention there is provided a pad having a non-slip surface, the pad adapted for attachment to a substrate and for use in combination with a garment worn by a person, the pad comprising a layer of a flexible non-slip material, having a lower surface adapted to be removably attached to said substrate and an upper surface which is partially covered by a hook and loop type fastener and the garment has a surface complementary to the hook and loop type fastener, such that in use the person can control the extent of engagement between the complimentary surface of the garment and the hook and loop type fastener of the pad by selectively placing the garment on the pad so that the complimentary surface car. contact both the hook and loop type fastener and non-slip material.

BRIEF DESCRIPTION OF THE DRAWINGS

By way of example only, the present invention will no be described with reference to the accompanying drawings in which.

DETAILED DESCRIPTION OF THE INVENTION

Figures 1, 2:
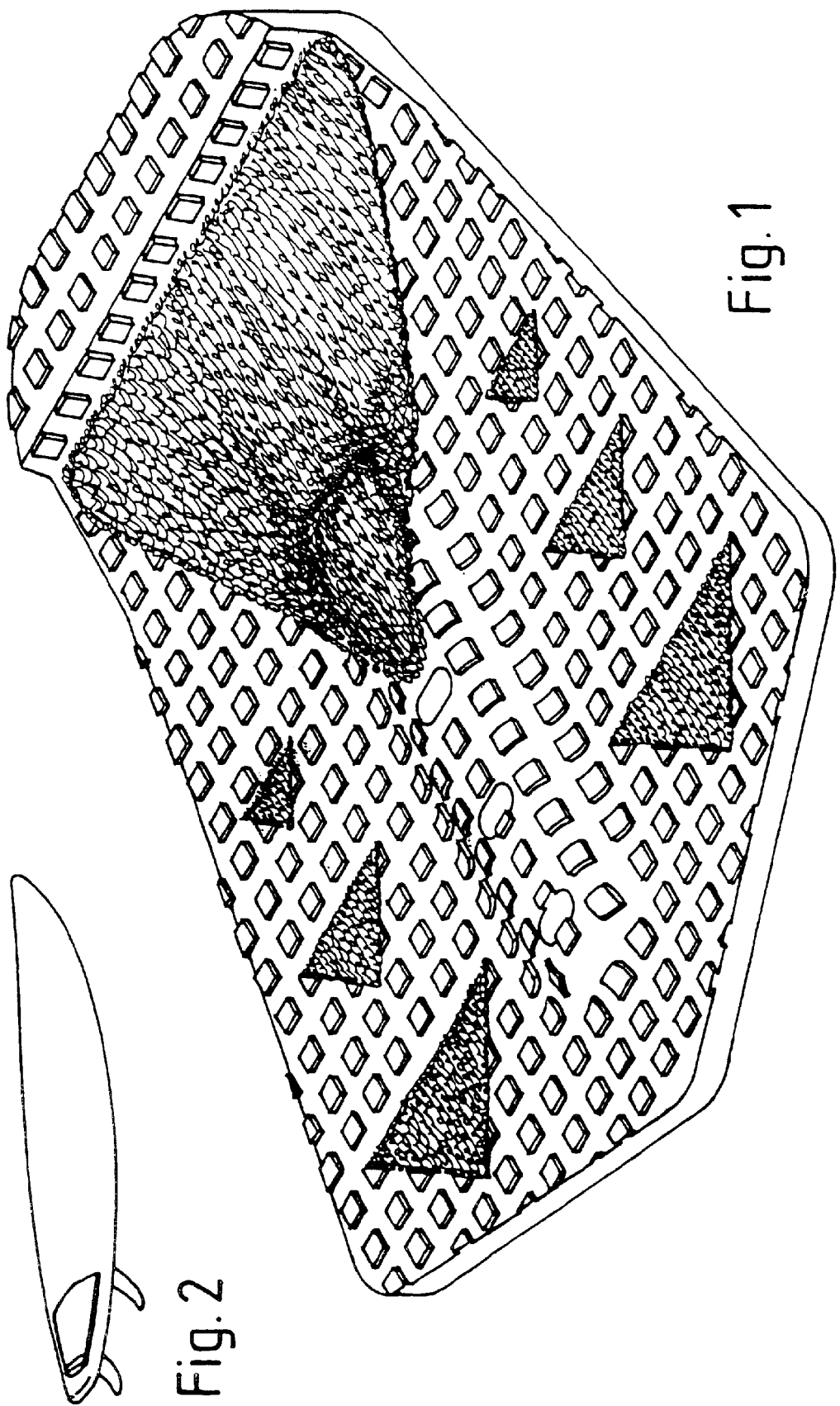
FIG. 1 illustrates a preferred pad of the present invention for use with a surfboard.
FIG. 2 illustrates a surfboard having the pad of FIG. 1 affixed thereto.

FIG. 1 illustrates a pad 11 for use on a surfboard. The pad is made from a layer 12 of a polyethylene vinyl acetate foam of 10 mm thickness. The layer 12 is embossed with squares 13. The pad 11 has a number of loop portions of a hook and loop fastener 14. The pad has a nose portion 15 and a heel portion 16. The heel portion has a raised ridge 17 extending across it. A triangular portion 14 of Velcro is attached to the pad. The base of the triangle abuts ridge 17 and its apex 18 extends along the longitudinal axis of the pad. The pad has a central rib 19 extending from near the nose portion and terminating beneath the apex 18. The pad is designed to be affixed to a rear section of a surfboard with the nose portion pointing towards the nose of the surfboard. FIG. 2 illustrates the pad when affixed to a surfboard 20.

Figure 3:
FIG. 3 illustrates a bootie for use with the surfboard illustrated in FIG. 2

FIG. 3 illustrates a wet suit bootie 25 made from neoprene. The bootie has a lower surface to which is attached a hook portion 25 of a hook and loop type fastener.

In use a rider inserts his of her foot into bootie 25 and places the bootie onto pad 11. The rider can slide the foot along the pad by locating the arch of the foot on rib 19. When the rider wishes to "lock" onto the surfboard the rider slides the foot backwards until the hook portion on the lower surface of the bootie engages loop portion 14 and the rider's heel abuts heel portion 16. The loop portion 14 is sized so that it is not possible for the whole of the rider's bootie to engage with the pad. The toe portion of the bootie normally remains in contact with the foam layer. This means that the rider can disengage from the "lock" position by rolling the foot forwards so that the heel disengages loop portion 14. As the toes are in contact with the non-slip foam, the rider can maintain control of the board. Also, in the event of the rider falling from the board, the rider can quickly disengage by kicking the board away from him. It can be seen that in this manner, the rider has control over release of the board. This is an additional safety feature, as by controlling the release of the board a rider can aim to avoid or minimize injury to himself and nearby riders.

Figure 4:
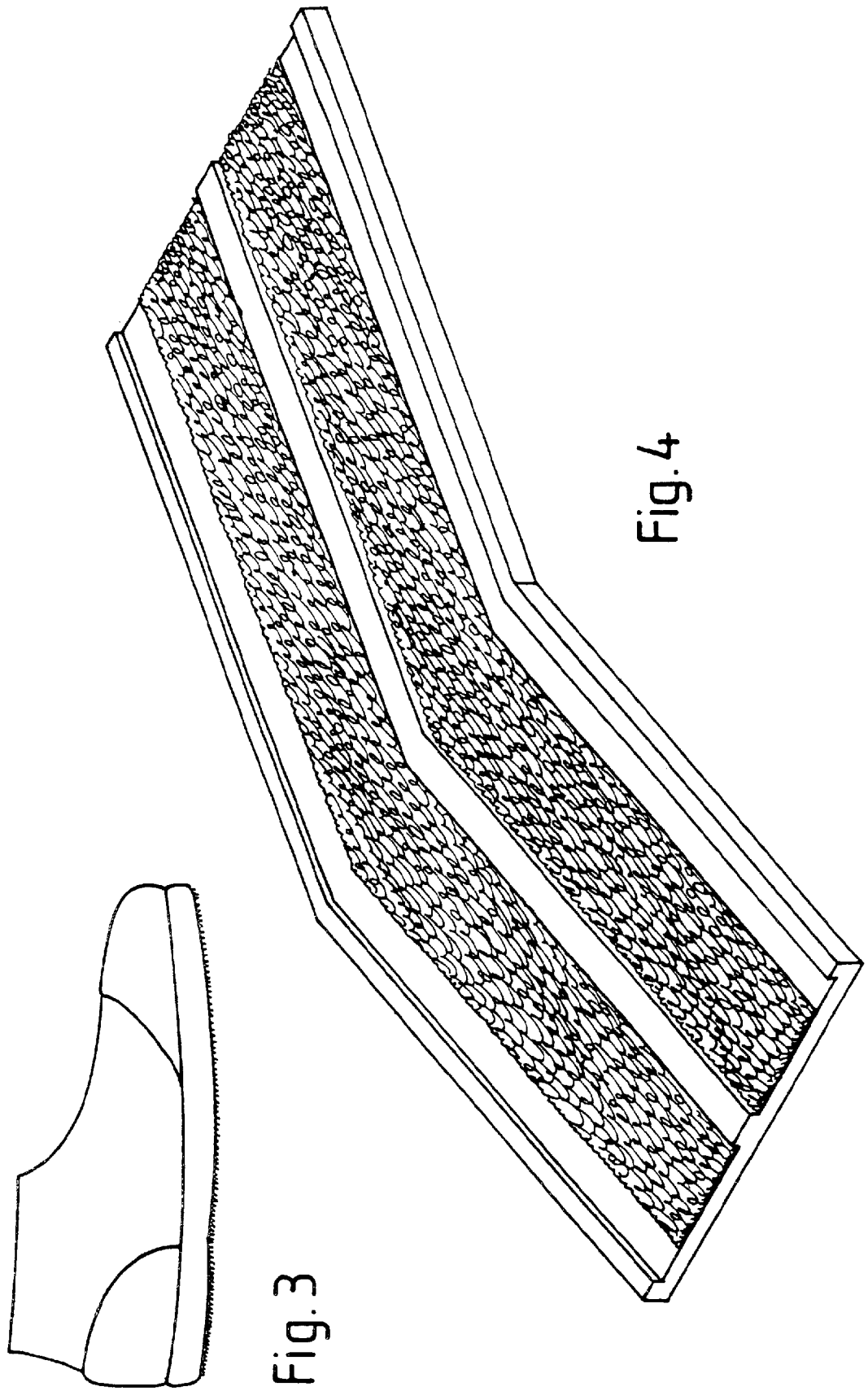
FIG. 4 illustrates a further preferred pad of the present invention.

FIG. 4 illustrates a further preferred pad 30 of the present invention. The pad is V shaped and made from an ethylene vinyl acetate foam. The pad 30 has portions 31 of the loop section of a hook and loop type fastener. This pad is designed for placement at the front of the board as illustrated in FIG. 2. The pad 30 has alternating loop and foam segments. The width of the loop segment is sized so that the rider's foot is not completely engaged with the loop portion. This allows the rider to disengage the front foot from the board as described above for the rear foot. This pad 30 can also include a central rib which is not covered by the hook and loop fastener. The rider can use this rib in a similar manner to that described above to move the foot along the pad.

It can be seen that in the pad as described above which has an upper surface having a combination of fastener and non-slip material, a rider is able to "lock" into engagement with a board and still be able to release from the board in a safe and controlled manner.

What is claimed is:

1. A deck pad for attachment to the deck of a surfboard, sailboard or boat and for use in combination with a garment having an outer surface which is engageable with a hook and loop fastener, said pad having a lower surface, a contact adhesive for adhesively attaching said lower surface of said pad to said deck of said surfboard, sailboard or boat, said pad further having an upper surface with one or more zones of a hook and loop fastener and one or more zones of a non-slip material, such that in use a person wearing the garment can control the extent of engagement between the garment and the pad by placing the garment on the upper surface of the pad at selected locations.

2. The pad of claim 1 wherein said garment is a footwear garment carrying a hook and loop fastener complementary to said foot and loop fastener on said pad.

3. The pad of claim 2 wherein the non-slip material is a foam.

4. The pad of claim 3 wherein the foam is ethylene vinyl acetate, polyurethane, ethylene or a mixture thereof.

5. The pad of claim 2 which further comprises a raised rib.

6. The pad of claim 5 which is adapted for use on the rear portion of a surfboard such that in use the rib aligns with the longitudinal axis of the board.

7. The pad of claim 1 in which the upper surface further includes water shedding channels.

8. The pad of claim 2 wherein the pad has an upper layer and a lower layer of the non slip material, said upper layer having openings therein, and the one or more zones of hook and loop fastener are sandwiched between the layers and protrude through said openings.

9. A surfboard having a deck pad attached thereto for use in combination with a garment having an outer surface which is engageable with a hook and loop fastener, said pad having a lower surface adhesively attached to said surfboard, said pad further having an upper surface with one or more zones of a hook and loop fastener and one or more zones of a non-slip material, such that in use a person wearing the garment can control the extent of engagement between the garment and the pad by placing the garment on the upper surface of the pad at selected locations.

10. A deck pad assembly for use in combination with a garment worn by a person, said pad assembly having a lower surface attachable to the deck of a watercraft or skateboard and an upper surface, said upper surface of said pad assembly having a plurality of grip enhancing zones having differing grip properties, at least one of said zones comprising a hook and loop fastener and wherein said garment has one or more zones of a complementary hoop and loop fastener, such that in use, by varying the position of placement of said garment on said pad assembly and thus varying the contact between said zones of said garment and said pad assembly, said person wearing the garment can selectively control the extent of engagement and thus grip between said garment and said pad assembly and wherein said pad assembly includes an upper layer and lower layer, said upper layer having openings therein and wherein said hook and loop fastener of said pad assembly is sandwiched between said layers and protrudes through said openings.

11. A pad assembly according to claim 10 wherein another of said zones of said pad assembly is free of said hook and loop fastener and comprises a non-slip surface.

12. A pad assembly according to claim 11 wherein said non-slip surface is defined by a foam plastics material.

13. A pad assembly according to claim 12 wherein said foam plastics material is ethylene vinyl acetate, polyurethane, ethylene or a mixture thereof.

14. A pad assembly according to claim 10 wherein another said zone of said pad comprises hook and loop fastener having a different density to the hook and loop fastener of said one zone.

15. A pad assembly according to claim 10 wherein another of said zones of said pad assembly comprises a raised rib or ridge.

16. A pad assembly according to claim 15 wherein said rib or ridge is moulded integrally with said pad assembly.

17. A deck pad assembly in combination with a surfboard for use in combination with a garment worn by a person, said pad assembly having a lower surface attached to a rear portion of said surfboard and an upper surface, said upper surface of said pad assembly having a plurality of grip enhancing zones having differing grip properties, at least one of said zones comprising a hook and loop fastener and another of said zones comprising a raised rib or ridge molded integrally with said pad assembly, said rib or ridge being aligned with the longitudinal axis of said surfboard, and wherein said garment has one or more zones of a complementary hoop and loop fastener, such that in use, by varying the contact between said zones of said garment on said pad assembly and thus varying the contact between said zones of said garment and said pad assembly, said person wearing the garment can selectively control the extent of engagement and thus grip between said garment and said pad assembly.

18. The pad assembly according to claim 17 in which said lower surface is adapted to be attached to said deck by a contact adhesive.

19. A pad assembly according to claim 17 in which said upper surface further includes water shedding channels.

20. A surfboard in combination with a deck pad assembly, said pad assembly having a lower surface attached to the deck of said surfboard and an upper surface including a zone or zones of a hook and loop fastener and a zone or zones comprising a non-slip surface.

21. A surfboard deck pad assembly according to claim 20 wherein said non-slip surface includes non-slip formations.

22. A surfboard deck pad assembly according to claim 20 wherein said non-slip surface is defined by a non-slip material.

23. A surfboard deck pad assembly in combination with an article of footwear, said pad assembly having a lower surface adapted to be attached to the deck of a surfboard and an upper surface including a zone or zones of a hoop and loop fastener and a zone or zones comprising a non-slip surface, and wherein said article of footwear has a hook and loop fastener thereon complementary to said hook and loop fastener on said pad assembly.

* * * * *